Nov. 1, 1966 A. BOEKHORST 3,283,065

REPRODUCTION DEVICE FOR COLOR TELEVISION SYSTEMS

Filed Oct. 28, 1963 2 Sheets-Sheet 1

INVENTOR.
ANTONIUS BOEKHORST
BY
Frank R. Jifari
AGENT

Nov. 1, 1966 A. BOEKHORST 3,283,065

REPRODUCTION DEVICE FOR COLOR TELEVISION SYSTEMS

Filed Oct. 28, 1963 2 Sheets-Sheet 2

INVENTOR.
Antonius Boekhorst
BY
Frank R. Trifari
AGENT

United States Patent Office 3,283,065
Patented Nov. 1, 1966

3,283,065
REPRODUCTION DEVICE FOR COLOR TELEVISION SYSTEMS

Antonius Boekhorst, Emmasingel, Eindhoven, Netherlands, assignor to North American Philips Company Inc., New York, N.Y., a corporation of Delaware Filed Oct. 28, 1963, Ser. No. 319,211
Claims priority, application Netherlands, Nov. 13, 1962, 285,460; May 2, 1963, 292,267
4 Claims. (Cl. 178—5.4)

The invention relates to a color television receiver of the type in which three color difference signals are each applied to an electrode of a separate gun of a three-gun picture tube, and in which the received luminance signal Y is applied to another electrode of each of the guns. In such a receiver the luminance signal is derived from the anode of an amplifier tube which is connected by way of an anode impedance to a source of supply voltage. The luminance signal is supplied by way of a D.C. connection to the cathodes of the three guns and the three color difference signals obtained after demodulation are supplied to the three control grids of the three guns. Such a circuit comprises means for attenuating the luminance signals for two of the three cathodes with respect to the luminance signal at the third cathode, and means for controlling the background brightness of the reproduced color television picture.

A circuit of this type is described in the book "Principles of Colour Television," edited by K. MacIllwain and C. E. Dean of the Hazeltine Laboratory, 1956 edition, pages 425 and 426 and in particular FIG. 15.25.

In this known circuit, the means for attenuating the luminance signals supplied to two of the three guns consists of two ohmic potentiometers which are connected to the anode of the amplifier tube, the luminance signals being derived from tappings on these potentiometers. The luminance signal for the third gun is directly derived from the anode of the amplifier tube.

The background brightness of the picture to be reproduced can be controlled by varying the ohmic part of the anode impedance of the amplifier tube.

The attenuation of two of the three luminance signals is necessary because, for example, the steepnesses of the three guns and also the efficiencies of the three phosphors which must radiate red, green and blue light respectively when they are struck by the electron beams, are not equal to one another.

However, the known circuit suffers from the disadvantage that when the supply voltage varies, inversion of color may occur. Since the luminance signal for two of the three cathodes is attenuated by means of ohmic potentiometers, the direct voltage at these two cathodes is different from that at the third cathode. Thus the direct voltage adjustment of the associated two control grids also differs from that of the direct voltage at the control grid of the remaining third gun. Since the direct voltages at the control grids, which as a matter of fact are also derived from the same source of supply voltage, are lower than the voltages at the cathodes, the variation of the control grid voltages will be smaller than the variation of the cathode voltages when the supply voltage varies. As a result of this, the electron beam supplied by the gun in question will experience a variation, namely will decrease if the supply voltage increases and will increase if the supply voltage decreases. Since, however, on variation of the supply voltage the control voltage for the third gun varies more than the control voltage for the other two guns, the electron beam emitted by the third gun will also vary more than that of the remaining two guns. Of these remaining two guns, that electron beam will vary least in intensity of which the cathode voltage is attenuated most.

The circuit will have to be adjusted so that, if the color difference signals which are supplied to the control grids are reduced to zero, for example, if only a black-and-white signal is received or if colorless pictures have to be reproduced when a color television signal is received, a bright white or a more grayish picture has to be reproduced.

If this is the case at the nominal supply voltage, when the supply voltage decreases, the white picture will change, to the color determined by the gun the cathode of which is directly connected to the amplifier tube and, when the supply voltage increases, to the color determined by the gun the cathode of which is attenuated most.

In order to mitigate this drawback, the reproduction device according to the invention is characterized in that to avoid such changes of color when the supply voltage varies, the two cathodes, for which the luminance signal is to be attenuated, are each connected through a negative feedback resistor to the anode of the amplifier tube. The means for controlling the background brightness consists of a single potentiometer circuit connected to the source of supply voltage, the variable tapping of the potentiometer circuit being conductively connected to the three control grids.

In order that the invention may readily be carried into effect, some possible embodiments of circuits according to the invention will be described more fully, by way of example, with reference to the accompanying drawings, in which.

Figure 1:
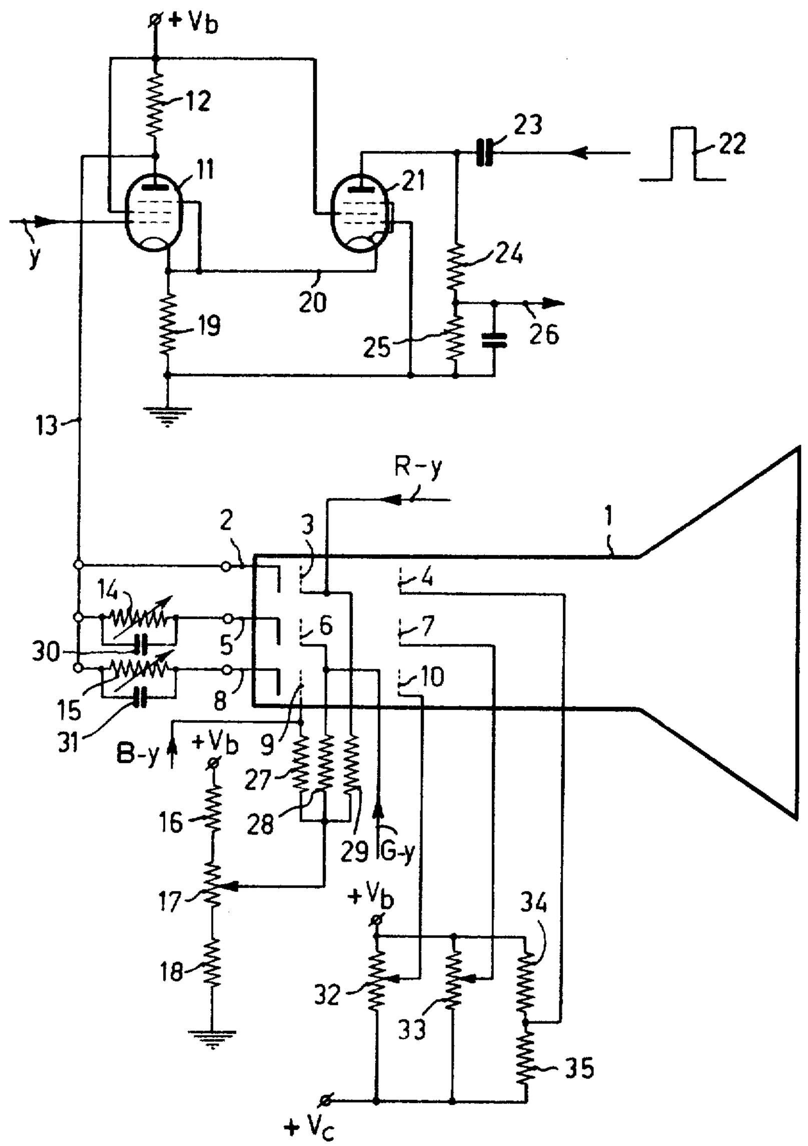
FIG. 1 shows a first embodiment of a circuit according to the invention.

In FIG. 1, the picture tube 1 is of the so-called shadow-mask type which comprises three guns each having a cathode, a control grid, a screen grid and, possibly, further accelerating anodes required for causing an electron beam of the desired intensity to impinge upon the screen. The red gun, for example, consists of a cathode 2, a control grid 3 and a screen grid 4, the green gun of a cathode 5, a control grid 6 and a screen grid 7, and the blue gun of a cathode 8, a control grid 9 and a screen grid 10.

The red color difference signal R–Y is supplied to the control grid 3, the green color difference signal G–Y to the control grid 6 and the blue color difference signal B–Y to the control grid 9, the luminance signal Y being supplied to the cathodes 2, 5 and 8.

This luminance signal Y is amplified in the video final tube 11, which is connected through an anode resistor 12 to a source of a positive supply voltage of $V_b$ volts. The luminance signal Y containing the direct current component is supplied to the control grid of tube 11. The anode of the tube 11 is connected conductively through the line 13 to the cathodes 2, 5 and 8 in order to be able to supply the luminance signal to these cathodes.

As already stated in the introduction, the connection between the anode of the amplifier tube 11 and the cathodes 2, 5 and 8 must be conductive so that the direct current component which contains the luminance signal Y is not lost.

In principle, the luminance signal would have to be applied to the three guns with an equally large intensity so that when the color difference signals supplied to the control grids 3, 6 and 9 are reduced to zero signals of equal intensity would be present to reproduce a bright-white picture or a more grayish picture.

However, in practice various causes appear to be present which render it necessary to supply the signals with different intensities to the three guns. These causes are inter alia that the steepnesses of the three guns are not equal to one another, and the efficiencies of the phosphors which have to reproduce the red, green and blue color respectively differ mutually. In the present embodiment it is assumed that the red gun has the worst overall efficiency, and the blue gun has the best efficiency. This means that the signal supplied to the red gun has to be attenuated least and the signal applied to the blue gun most. This is effected, as usual, by attenuating in the correct manner the luminance signals which have to be applied to these three cathodes.

According to the invention, however, this attenuation is effected by providing a negative feedback resistor 14 between the line 13 and the green gun 5 and a negative feedback resistor 15 between the line 13 and the blue gun 8. By providing these resistors it is achieved that the attenuation of the luminance signals Y for these two guns is effected by negative feedback so that when the three guns are cut off no voltage drop can occur across the resistors 14 and 15 and the three cathode voltages are consequently equal for the black reproduction, while also, on variation of the supply voltage $V_b$, change of color is avoided. In addition, this method has the advantage that the luminance control is possible for the three control grids 3, 6 and 9 simultaneously with a single potentiometer circuit consisting of the resistors 16, 17 and 18, which renders the adjustment of the luminance much simpler than when separate direct voltages for the three control grids have to be adjusted.

That in the system according to the invention change of color is avoided indeed may be explained as follows.

The resistors 14 and 15 are variable resistors and may consequently be adjusted so that when the color difference signals which are applied to the control grids 3, 6 and 9 are reduced to zero, a white picture is indeed reproduced by the luminance signal Y which is then supplied only. This means that the resistors 14 and 15 are adjusted so that the luminance signal supplied to the green gun and the luminance signal supplied to the blue gun are sufficiently attenuated with respect to the luminance signal applied to the red gun. When, for example, the current through the video final tube 11 is such that a black image is to be reproduced, the voltages of the cathodes 2, 5 and 8 with respect to the direct voltages of the control grids 3, 6 and 9 are of such a value that the three guns are cut off and no electron current can flow from these cathodes to the screen of the tube 1. Let it now be assumed that in this condition the supply voltage $+V_b$ increases. As a result of this, the anode voltage of the amplifier tube 11 will increase, and the extent of increase is determined by the fact whether the anode current of this tube is stabilised at black level or not. As a rule, an automatic intensity control is used in a television receiver for reproducing colors, the voltage for this automatic intensity control being derived from the video final tube. This is also the case in the present embodiment. For this purpose the cathode of the tube 11 is connected to earth through a cathode resistor 19 and through a line 20 to the cathode of a further amplifier tube 21 by means of which the voltage for the automatic intensity control is obtained in the conventional manner. Impulses 22 obtained from the horizontal deflection circuit are supplied through the capacitor 23 to the anode of the tube 21, so that a negative control voltage is developed at the anode of the tube 21 which is independent of the intensity of the luminance signal Y received. This negative control voltage is attenuated to the desired value by means of the potentiometer circuit consisting of the resistors 24 and 25 and then supplied through the line 26 to the control grid of intermediate frequency and/or high frequency amplifier tubes in order to realise the automatic intensity control. In many modern receivers, the flyback pulse 22 is delayed, for example by differentiating networks, so that control is effected on the black level porches which occur after the line synchronising pulses which are present in the luminance signal Y. In that case it may be stated that the black level is stabilised, which results in stabilisation of the anode current through the tube 11 for this black porch value irrespective of the value of the supply voltage. Thus the voltage drop across the resistor 12 for this black porch level will remain equal and the voltage variation at the anode of the tube 11 will be equal to the variation of the supply voltage $V_b$. However, the situation is also possible in which the black level is not entirely stabilised by the automatic intensity control or by other measures, so that in case of variation of the supply voltage the anode current through the tube 11 will also vary a little. When the supply voltage $V_b$ increases this means that also the anode current through the tube 11 will increase a little and therewith the voltage drop across the resistor 12. In that case, consequently, the voltage variation at the anode of the tube 11 will be smaller than in the case in which the anode current was entirely stabilised. In the case in which the supply voltage $V_b$ decreases, a similar reasoning may be held because in that case the anode current decreases also a little and consequently the anode voltage will experience a smaller variation than the supply voltage $V_b$.

Since, however, the direct voltages at the control grids 3, 6 and 9 are adjusted at a far smaller value by means of the potentiometer circuit 16, 17, 18 than the voltage at the anode of the tube 11 for black porch level, the variation of the direct voltage at these control grids will be much smaller than the variation of the anode voltage. Consequently, when the supply voltage $V_b$ decreases, the three guns will no longer be cut off but tend to convey a certain current. However, this current, in as far as the green and blue guns are concerned, will immediately be fed back negatively by means of the resistors 14 and 15, so that, in spite of the fact that the luminance signal is zero, a grayish picture will be reproduced all the same because the direct voltages occurring in that case which are operative between the control grids and the cathodes are attenuated in the same manner by the action of the negative feedback resistors 14 and 15 as if they were control voltages. If the luminance signal Y increases above the black porch value, the above reasoning remains valid because the luminance signal in that case is added as it were to the direct voltages present as a result of the variation in supply voltage which is operative between the control grids and the cathodes of the three guns. In this case also the attenuation remains operative by the negative feedback resistors 14 and 15 individually and avoids change of color. This may also be stated so that the attenuation of the luminance signals is now effected for each gun individually and is dependent on the current occurring through the gun itself in question. Consequently, this attenuation will immediately become operative irrespective of the fact whether the control takes place by the luminance signal Y itself or whether the control takes place as a result of supply voltage variations.

It will be clear that when the supply voltage $V_b$ increases a reversed reasoning can explain that no change of color occurs. For, if the supply voltage increases, the guns remain cut off longer and the luminance signal Y will have to increase with respect to the black porch value which at the nominal supply voltage determines the cut off voltage for the three guns before an electron current tends to flow through the three guns. In these electron currents, however, again the desired attenuations by the resistors 14 and 15 occur in this case, so that no change of color occurs.

It is noted that by the measure according to the invention it is not avoided that in case of supply voltage variations, variation in the background brightness occurs. However, no change of color will occur and change of color is particularly annoying because when a white color surface suddenly becomes a colored color surface it is immediately observed by the viewer, whereas the variation in brightness is hardly annoying.

It is further noted that the resistors 27, 28 and 29 are provided as grid leakage resistors between the variable tapping on the resistor 17 and the control grids 3, 6 and 9 but that these are not essential for the operation of the reproduction device. The capacitors 30 and 31 are very small, for example in the order of 100 pf., and only serve for transmitting the very high frequencies to the cathodes. It may therefore be said that the resistors 14 and 15 ensure both the direct current negative feedback and the alternating current negative feedback and if a transmission of the very high frequencies, for example those of approximately 5 mc./s., is deemed unnecessary, the capacitors 30 and 31 may also be omitted. Although it is assumed in the above embodiment that the red gun requires most control voltage and the blue gun least control voltage, this may differ for each individual tube. In that case the resistors 14 and 15 may be included in other cathode lines. Let it be assumed, for example, that the green gun requires most control voltage and the blue gun least control voltage; in that case the resistor 14, if desired shunted by the capacitor 30, must be included between the line 13 and the cathode 2, the line 13 in this case being connected directly to the cathode 5. The operation of the circuit further remains entirely identical to that shown in the accompanying FIG. 1.

It is described above that the information for producing the voltage for the automatic intensity control is derived from the cathode of the amplifier tube 11. However, it will be clear that this information may also be derived from other points in a television receiver for reproducing color television pictures. In that case, the anode current through the tube 11 may be stabilised less favorably at black level, but as proved above, this is not essential for the invention. It may even be said that, if the anode current varies somewhat, this is more favorable with respect to the change of color, because then the variations on the cathodes will be less large and consequently the intensity variations of the electron beams supplied by the three guns will be less large. The measure according to the invention in that case shows to even better advantage. However, the resistors 14 and 15 may always be adjusted so that also when the circuit is stabilised exactly at black level, change of color is avoided.

In FIG. 1 are shown the resistors 32, 33, 34 and 35. The parallel arrangement of these resistors is connected between the supply voltage $V_b$ and the so-called booster voltage $V_c$, which may be derived from the booster capacitor of the horizontal final stage in the television receiver in which the reproduction device is included and which voltage $V_c$ is many times larger than the supply voltage $V_b$. By means of the variable tapping on the resistor 32, the desired screen grid voltage for the screen grid 10 of the blue gun may be adjusted, with the resistor 33 the screen grid voltage for the screen grid 7 of the green gun and by the choice of the resistors 34 and 35 the screen grid voltage for the screen grid 4 of the red gun. The resistors 32 and 33 are provided with variable tappings in order to be able to readjust the cut off voltages for the green and the blue guns separately. The adjusting procedure is so that first the exact cut off voltages for the three guns are adjusted by means of the resistors 32, 33, 34 and 35 and then the white adjustment is controlled by means of the resistors 14 and 15. In this case a further advantage of the circuit arrangement according to the invention is obtained namely that once the cut off voltages have been adjusted by means of the resistors 32, 33, 34 and 35 the so-called white adjustment with the resistors 14 and 15 is possible and it is not necessary to return to the black adjustment because this is independent of the adjustment of the negative feedback resistors which do not cause a voltage drop when the gun is cut off. The adjustment of the background brightness may be chosen by the user of the reproduction device, so that only the button with which the variable tapping on the resistor 17 can be varied is available for external control. The other adjustments are effected during the construction of the receiver. Finally, a particular advantage is that the negative feedback is operative both for the cathode control with Y signal and the grid control with the color difference signals. As a result of this it is achieved that in the receiver no separate adjustment possibility is required for the exact ratio of R–Y, B–Y and G–Y signals but it is sufficient to have a fixed matrix circuit which ensures that the Y components for these three signals are equal.

Finally it is noted that although above the tube 1 is shown as a shadow-mask tube, the measure according to the invention may also advantageously be used for other types of tubes with three guns, for example the chromatron tube with three guns. Also when three separate tubes are used for reproducing the red, green and blue colors, the negative feedback resistors and the said adjustments remain necessary since in that case also the white adjustment is extremely important.

The above device, however, has the following drawback. As is known, negative feedback has a double effect. First, the signal to be treated is attenuated and, secondly, the negative feedback has a linearising effect, as a result of which the influence of the curvature of the characteristic of the amplifier, either tube or transistor, is compensated more or less.

In case of a color television picture tube, however, this second effect is undesirable since the incoming television signal is adapted as readily as possible to such nonlinearising characteristics (gamma-corrected signal) and, in addition, the three gun systems must each operate with the same degree of distortion. So, if linearising action were permitted for two of the three guns, the degree of distortion for two guns would be different with respect to that of the third gun. As a result of this, the constant luminance principle, which does not come to full advantage all the same as a result of the nonlinear characteristic of the picture tubes, would experience a further deterioration.

Figure 2:
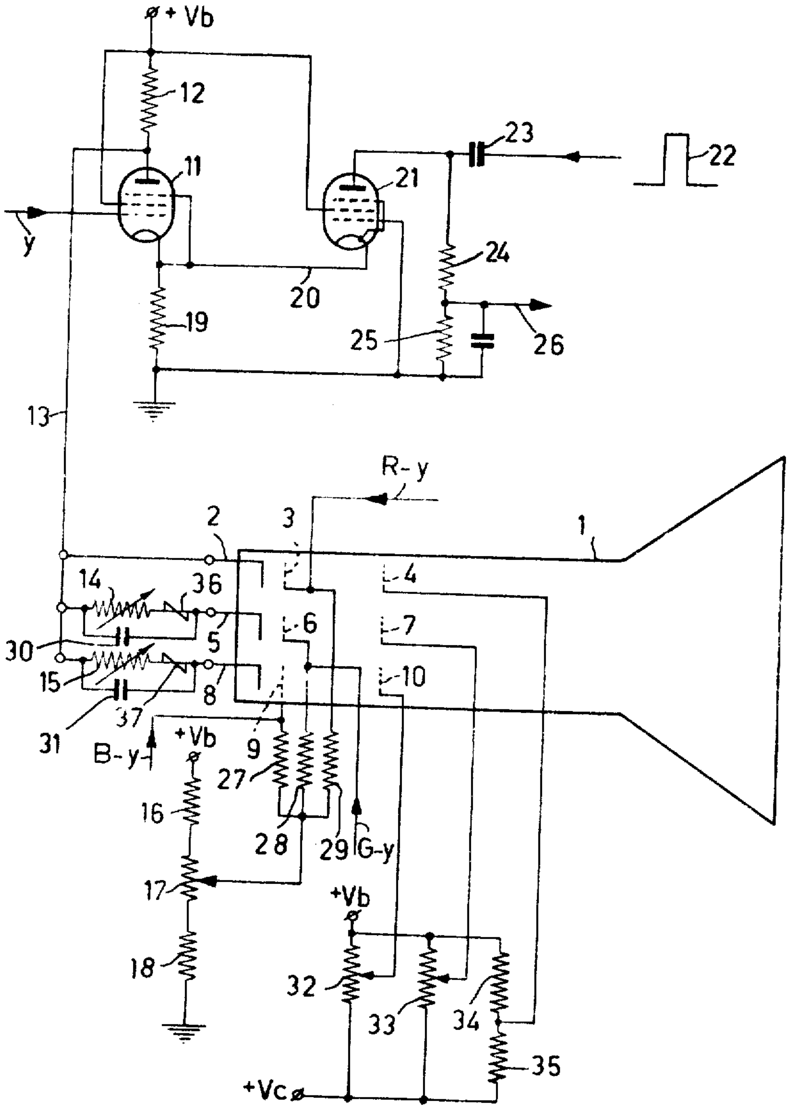
FIG. 2 shows an embodiment which is somewhat improved with respect to that of FIG. 1.

In order to ensure that the attenuation of the signal supplied to the two cathodes 5 and 8 is maintained without the drawback of the linearising action, an improved embodiment is shown in FIG. 2.

According to the improvement, the attenuation is effected by including between the line 13 and the green gun 5 not only a variable ohmic resistor 14 but also a nonlinear resistor 36 and, between the line 13 and the blue gun 8, a nonlinear resistor 37 in addition to a variable ohmic resistor 15.

The ohmic resistors 14 and 15 in the embodiment shown in FIG. 2 have the function of adapting the nonlinearising action of the nonlinear resistors 36 and 37 to the nonlinear current-voltage characteristics of the green and blue guns.

In this embodiment the nonlinear resistors 36 and 37 are so-called voltage-dependent resistors (V.D.R.'s), the current-voltage characteristic of which is given by $$V_K = C i_a^{\beta} \qquad (1)$$

in which $\beta$ and C are constants which may vary for each type of resistor. In this case, $\beta$ may assume values for the present types of V.D.R.'s which lie between $\beta=1/4$ and $\beta=1/5$.

The anode current-grid voltage characteristics of the guns, however, is given by $$i_a=KV_{g1}^{\gamma} \quad (2)$$

in which K is a constant and also $\gamma$ is to be considered substantially as a constant.

As will be explained below, the nonlinearising action of the guns will not be substantially varied if $\gamma=1/\beta$, that is to say if the current voltage characteristic of nonlinear resistor and gun are identical. As a matter of fact, the current-voltage characteristic of a nonlinear resistor may also be written as:

$$i_a=(1/C)^{1/\beta}.V_K^{1/\beta} \quad (3)$$

and the characteristic given by the Equation (3) is identical to that according to Equation (2) if $\gamma=1/\beta$.

As a rule, $\gamma$ lies between the values 2 and 2.2 and since it is already indicated that $\beta$ lies between 1/4 and 1/5 it follows that the condition $\gamma=1/\beta$ is not satisfied as such. However, by arranging the ohmic resistors 14 and 15 in series with the nonlinear resistors 36 and 37, the value of $\beta$ is increased (the resistors 14 and 15 operate as it were linearisingly for the nonlinear resistors 36 and 37, so that the factor $\beta$ more approaches the value 1) so that approximately $\beta$ must assume the value 1/2 if $\gamma=2$.

Naturally, if desired, an ohmic resistor may also be connected in parallel with the resistors 36 and 37. The main thing only is that for the negative feedback resistor in its totality, nonlinear resistor itself plus possible ohmic resistors connected in series and/or in parallel it holds that $\gamma=1/\beta$.

If this condition is satisfied by the the nonlinear resistor itself, the ohmic resistors may be omitted. This is possible, for example, if the $\gamma$ value of the guns has a larger value than the above values of 2 or 2.2. This is also possible by giving the substance from which the V.D.R.'s are manufactured other components, as a result of which also a larger value of $\beta$ can be obtained. Finally, also a so-called resistor with negative temperature coefficient (NTC) may be used. Resistors of this type, however, as a rule are inert, which renders them unsuitable for use as a negative feedback resistor in a picture tube. As a matter of fact, the video signal usually contains rapid variations which cannot be followed by such an NTC resistor. In case of pictures, on the contrary, in which no rapid variations occur, an NTC resistor might well be used.

Assuming that $\gamma=2$ indeed and that by including ohmic resistors in the circuit a value of $\beta=1/2$ is obtained, it will be proven below that the input signal is indeed attenuated by the negative feedback and that the original nonlinearity is maintained.

For the grid voltage $V_{g1}$ of the green or blue gun it may be written:

$$V_{g1}=V_i-V_K \quad (4)$$

in which $V_i$ is the controlling potential difference between the line 13 and one of the control grids 6 or 9 and $V_K$ is the voltage drop across the negative feedback resistor (voltage drop across the series arrangement of 14 and 36 for the green gun and voltage drop across the series arrangement of 15 and 37 for the blue gun).

Inserting the value given by the Equation (1) for $V_K$ and simultaneously substituting Equation (4) in Equation (2) results in $$i_a=K(V_i-Ci_a^{\beta})^{\gamma} \quad (5)$$

It was assumed that $\gamma=2$ and $\beta=1/2$, so that the Equation (5) becomes $$i_a=K\{V_i^2-2V_iCi_a^{1/2}+C^2i_a\}$$

which may also be written as $$i_a(1-KC^2)+i_a^{1/2}2KCV_i-KV_i^2=0 \quad (6)$$

Solving the value of the anode current $i_a$ from the Equation (6) gives $$i_a=(KV_i^2)/(1+\sqrt{KC^2})^2 \quad (7)$$

According to Equation (2) the anode current without negative feedback would have been:

$$i_a=KV_i^2$$

Since K and C are positive constants, it follows from the Equation (7) that the anode current $i_a$ obtained as a result of the negative feedback is attenuated but that its nonlinear dependence of the controlling signal $V_i$ has remained the same. The extent of attenuation is determined by the product $KC^2$. Since the value of C is determined by the type of nonlinear resistor, the desired negative feedback can be adjusted by the choice of the resistors 36 and 37.

It will be clear that by means of the Newton binomial also for any value of $\gamma$ and $\beta$ it can be proved that by the negative feedback with nonlinear resistors the anode current $i_a$ is attenuated and the nonlinearity is not attacked if only it holds that $\gamma=1/\beta$.

In this case also the negative feedback resistors may be included in the cathode lines of the red and blue guns or in the cathode lines of the red and green guns instead of in the cathode lines of the green and blue guns if the sensitivity of the picture tube in question renders this necessary.

What is claimed is:

1. A color television receiver comprising display means having a plurality of electron gun means, each gun having a cathode and a control grid, a source of operating potential having first and second terminals, a source of luminance signals comprising an amplifier device with an output electrode, and output circuit connecting said output electrode to said first terminal, whereby said luminance signals are provided at said output circuit, direct current conductive means for connecting said output circuit to each said cathode, a source of a plurality of color difference signals, means applying said color-difference signals to separate control grids, and brightness control means comprising potentiometer means connected between said first and second terminals, said potentiometer means having a tap, and direct current conductive means connecting said tap to all of said control grids, the direct current conductive means for connecting said output circuit to at least one of said cathodes comprising negative feedback resistor means in series between said output circuit and said one cathode, the direct current conductive means for connecting said output circuit to at least another one of said cathodes comprising substantially non-resistive conducting means.

2. A color television receiver comprising a picture tube having three electron guns, each gun having a cathode and a control grid, a source of operating potential having first and second terminals, a source of luminance signals comprising an amplifier device with an output electrode, and output circuit means connecting said output electrode to said first terminal, whereby said luminance signals are provided at said output circuit, direct current conductive means for conducting said output circuit to each of said cathodes comprising means for connecting one of said cathodes substantially directly to said output circuit and separate negative feedback resistor means for connecting said output circuit to the other two cathodes, a source of three color-difference signals, means for applying said color-difference signals to separate control grids, and brightness control means comprising potentiometer means connected between said first and second terminals, said potentiometer means having a tap, and direct current conductive means connecting said tap to all of said control grids.

3. The receiver of claim 2, wherein said negative feedback resistor means comprises solely resistance means having a nonlinear current-voltage characteristic with substantially the same nonlinearity as the current-voltage characteristic of the respective electron gun.

4. The receiver of claim 2, wherein said negative feedback resistor means comprises linear resistance means and nonlinear resistance means connected to have a total nonlinear current-voltage characteristic with substantially the same nonlinearity as the current-voltage characteristic of the respective electron gun.

References Cited by the Examiner

UNITED STATES PATENTS 2,935,556 5/1960 Barco -------------- 178—5.4

OTHER REFERENCES

McIlwain et al., Principles of Color Television, Wiley and Sons, New York, 1956, pp. 424–425.

DAVID G. REDINBAUGH, *Primary Examiner.*

J. A. O'BRIEN, *Assistant Examiner.*